US011302086B1

United States Patent
Stoyles et al.

(10) Patent No.: US 11,302,086 B1
(45) Date of Patent: *Apr. 12, 2022

(54) PROVIDING FEATURES OF AN ELECTRONIC PRODUCT IN AN AUGMENTED REALITY ENVIRONMENT

(71) Applicant: Apple Inc., Cupertino, CA (US)

(72) Inventors: Justin D. Stoyles, San Francisco, CA (US); Michael Kuhn, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/142,134

(22) Filed: Jan. 5, 2021

Related U.S. Application Data

(63) Continuation of application No. 16/897,551, filed on Jun. 10, 2020, now Pat. No. 10,891,800, which is a continuation of application No. 16/140,286, filed on Sep. 24, 2018, now abandoned.

(60) Provisional application No. 62/565,668, filed on Sep. 29, 2017.

(51) Int. Cl.
*G06T 19/00* (2011.01)
*G06F 3/04815* (2022.01)
*G06T 7/00* (2017.01)
*G06F 3/04883* (2022.01)

(52) U.S. Cl.
CPC ........ *G06T 19/006* (2013.01); *G06F 3/04815* (2013.01); *G06F 3/04883* (2013.01); *G06T 7/0002* (2013.01)

(58) Field of Classification Search
None
See application file for complete search history.

(56) References Cited

U.S. PATENT DOCUMENTS

| 9,541,407 | B1 | 1/2017 | Mohler |
| 10,891,800 | B1 | 1/2021 | Stoyles et al. |
| 2005/0171926 | A1 | 8/2005 | Thione et al. |
| 2007/0074133 | A1 | 3/2007 | Hara et al. |
| 2007/0175998 | A1 | 8/2007 | Lev |
| 2011/0076003 | A1 | 3/2011 | Cho et al. |
| 2011/0257958 | A1 | 10/2011 | Kildevaeld |
| 2013/0016042 | A1 | 1/2013 | Makinen et al. |
| 2014/0156412 | A1 | 6/2014 | Tse |
| 2014/0267796 | A1 | 9/2014 | Jang et al. |
| 2017/0039765 | A1 | 2/2017 | Zhou et al. |
| 2017/0336926 | A1 | 11/2017 | Chaudhri et al. |
| 2017/0365097 | A1 | 12/2017 | Lim et al. |

(Continued)

OTHER PUBLICATIONS

Applicant-Initiated Interview Summary received for U.S. Appl. No. 16/140,286, dated Feb. 20, 2020, 5 pages.

(Continued)

*Primary Examiner* — Jwalant Amin
(74) *Attorney, Agent, or Firm* — Dentons US LLP

(57) ABSTRACT

The present disclosure relates to providing a software feature of an electronic product in an augmented reality (AR) environment. In some embodiments, images are obtained using one or more image sensors, a determination is made whether the obtained images include printed media depicting the electronic product, when the obtained images include the printed media depicting the electronic product, a virtual object corresponding to the electronic product is displayed in the AR environment, and the software feature of the electronic product is provided with the virtual object.

21 Claims, 12 Drawing Sheets

(56) References Cited

U.S. PATENT DOCUMENTS

| | | |
|---|---|---|
| 2018/0066956 A1 | 3/2018 | Kim et al. |
| 2018/0322076 A1 | 11/2018 | Prasad et al. |
| 2018/0350144 A1 | 12/2018 | Rathod |
| 2019/0025999 A1 | 1/2019 | Murphy et al. |
| 2019/0084670 A1 | 3/2019 | Sharma et al. |
| 2019/0213212 A1 | 7/2019 | Adato et al. |
| 2021/0208741 A1 | 7/2021 | Yang et al. |

OTHER PUBLICATIONS

Non-Final Office Action received for U.S. Appl. No. 16/140,286, dated Oct. 3, 2019, 14 pages.
Non-Final Office Action received for U.S. Appl. No. 16/897,551, dated Jun. 25, 2020, 12 pages.
Notice of Allowance received for U.S. Appl. No. 16/140,286, dated Mar. 12, 2020, 5 pages.
Notice of Allowance received for U.S. Appl. No. 16/897,551, dated Oct. 16, 2020, 5 pages.
"Text of 2nd CD Mixed and Augmented Reality (MAR) Reference Model", International Organisation for Standardisation Organisation Internationale De Normalisation, ISO/IEC JTC 1/SC 29/WG 11, Coding of Moving Pictures and Audio, Feb. 2016, 67 pages.
Stone, Zeda, "Could AR Be the Unlikely Savior of Print?", Online available at: https://adage.com/article/digitalnext/ar-savior-print/308923, May 11, 2017, 4 pages.
"Apple Previews Powerful Software Updates Designed for People with Disabilities", Available online at: https://www.apple.com/newsroom/2021/05/apple-previews-powerful-software-updates-designed-for-people-with-disabilities/, May 19, 2021, 10 pages.

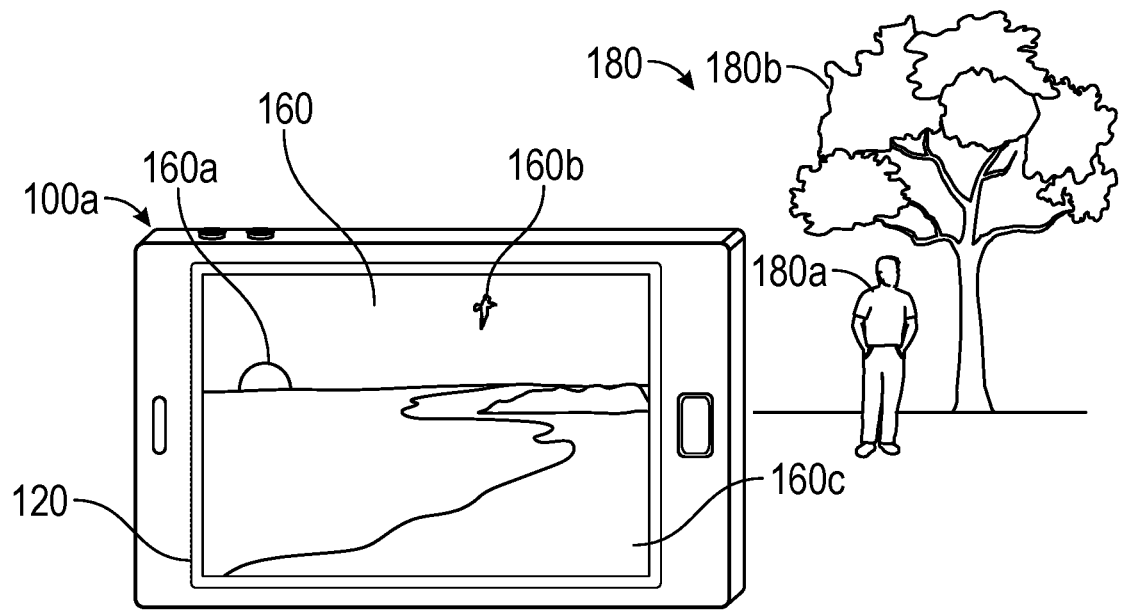
FIG. 1C  Virtual Reality
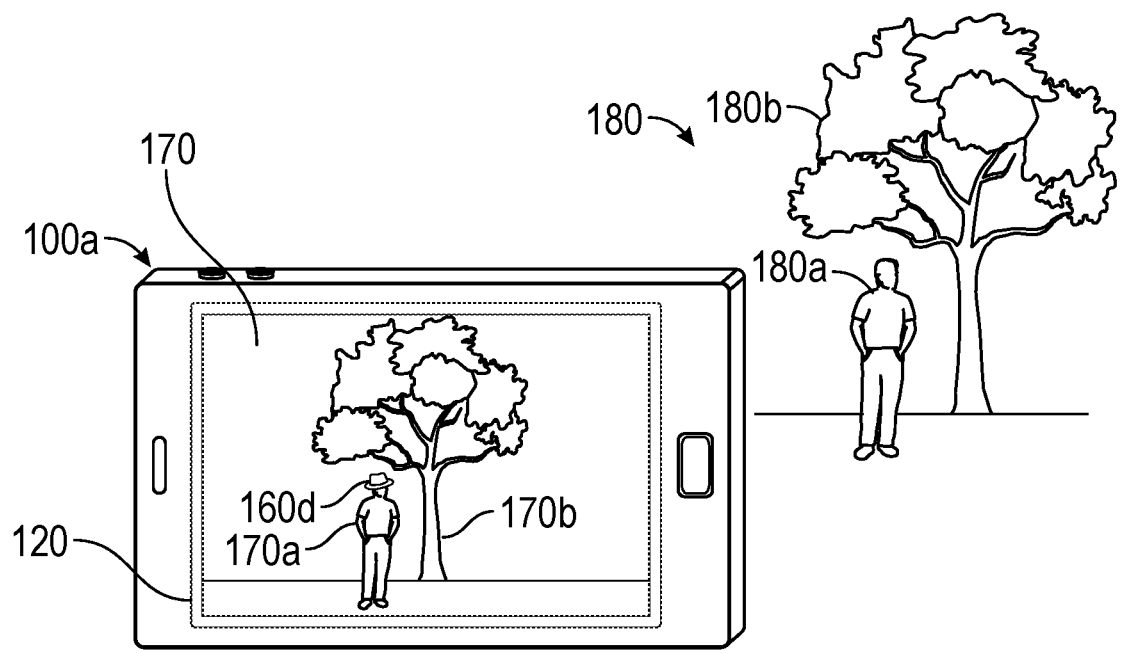
FIG. 1D  Augmented Reality (pass-through video)

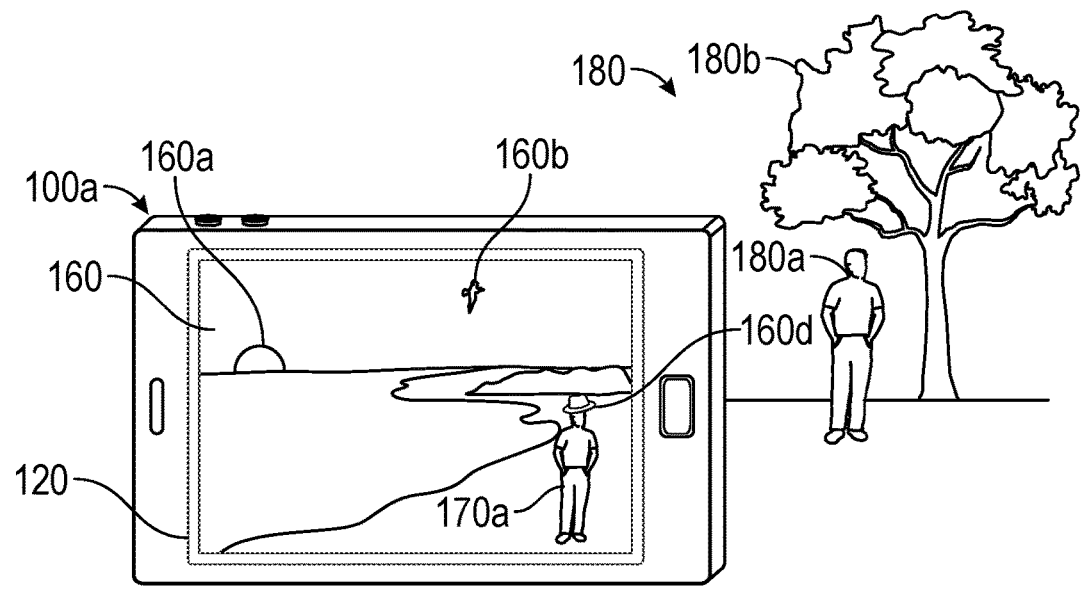
FIG. 1E  Augmented Virtuality
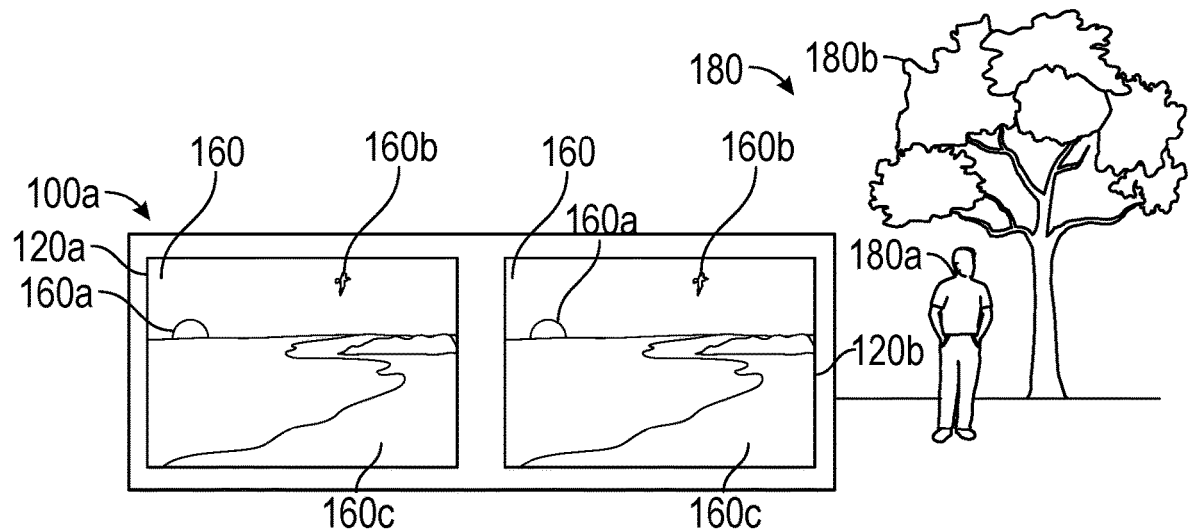
FIG. 1F  Virtual Reality

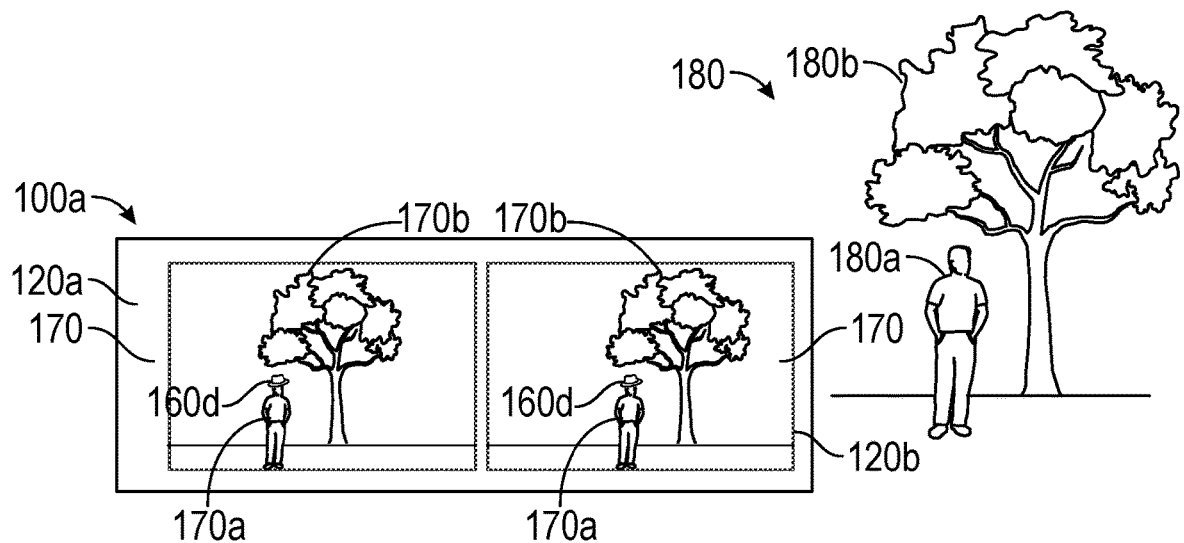
FIG. 1G     Augmented Reality (pass-through video)
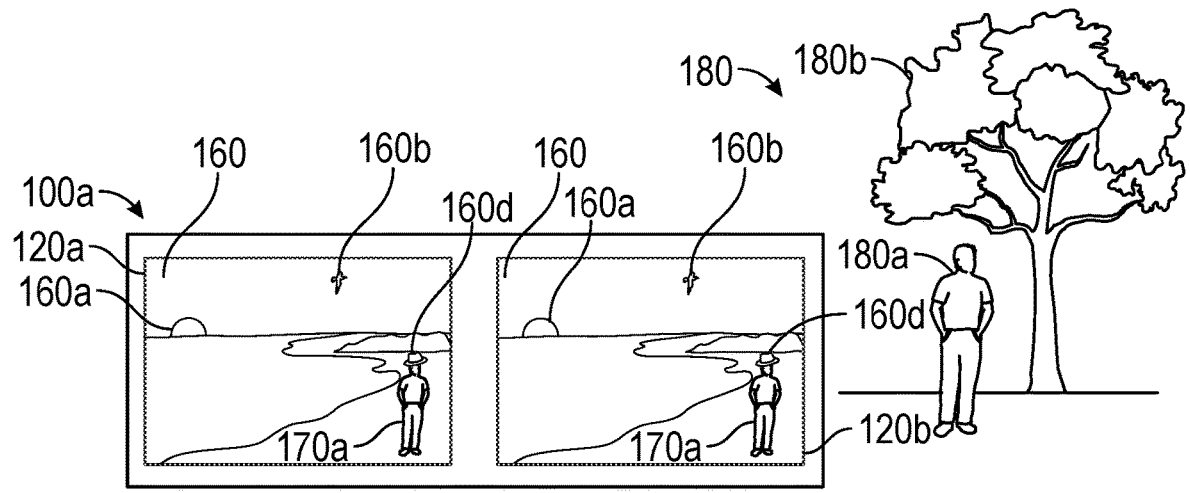
FIG. 1H     Augmented Virtuality Augmented Reality
(heads-up display)

PROVIDING FEATURES OF AN ELECTRONIC PRODUCT IN AN AUGMENTED REALITY ENVIRONMENT

CROSS-REFERENCE TO RELATED APPLICATIONS

This application is a continuation of U.S. patent application Ser. No. 16/897,551, entitled "PROVIDING FEATURES OF AN ELECTRONIC PRODUCT IN AN AUGMENTED REALITY ENVIRONMENT," filed on Jun. 10, 2020, which is a continuation of U.S. patent application Ser. No. 16/140,286, entitled "PROVIDING FEATURES OF AN ELECTRONIC PRODUCT IN AN AUGMENTED REALITY ENVIRONMENT," filed on Sep. 24, 2018, which claims the benefit of U.S. Provisional Patent Application No. 62/565,668, entitled "PROVIDING FEATURES OF AN ELECTRONIC PRODUCT IN AN AUGMENTED REALITY ENVIRONMENT," filed on Sep. 29, 2017, which are hereby incorporated by reference in their entirety.

TECHNICAL FIELD

The present disclosure relates generally to augmented reality environments, and more specifically to representations of electronic products in augmented reality environments.

BACKGROUND

Printed media are physical objects that include depictions of text and/or images. Examples of printed media include books, magazines, newspapers, flyers, billboards, posters, and the like. In some cases, printed media include depictions of physical, real-world products, such as mobile phones, computers, televisions, and so on.

SUMMARY

Described herein are techniques for providing features of an electronic product in an augmented reality (AR) environment. In some embodiments, a technique for providing software features of the electronic product in the AR environment includes obtaining images using one or more image sensors; determining whether the obtained images include printed media depicting the electronic product; in accordance with a first set of one or more conditions being satisfied, the first set of one or more conditions including a first condition that is satisfied when the obtained images include the printed media depicting the electronic product, displaying a virtual object corresponding to the electronic product in the AR environment; and in accordance with a second set of one or more conditions being satisfied, the second set of one or more conditions including a second condition that is satisfied when the virtual object corresponding to the electronic product is displayed, providing, with the virtual object, the software feature of the electronic product.

In some embodiments, the technique further includes detecting a user interaction with the software feature; and modifying the virtual object corresponding to the electronic product based on the user interaction. In some embodiments, detecting the user interaction includes detecting a touch contact on a touch-screen display at a location corresponding to the provided software feature. In some embodiments, detecting the user interaction includes detecting that a physical position of the user's hand or finger corresponds to a position in the AR environment of the software feature.

In some embodiments, the first set of one or more conditions include a third condition that is satisfied when the printed media corresponds to predefined printed media. In some embodiments, the predefined printed media is a predefined book, a predefined page of a predefined book, or a predefined depiction of the electronic product. In some embodiments, the first set of one or more conditions include a fifth condition that is satisfied when the depiction of the electronic product in the printed media includes a depiction of a screen of the electronic product. In some embodiments, the first set of one or more conditions include a sixth condition that is satisfied when a user input is detected.

In some embodiments, the second set of one or more conditions include a seventh condition that is satisfied when a user interaction with the virtual object is detected.

In some embodiments, providing the software feature includes displaying, with the virtual object corresponding to the electronic product, an artificial boot-up sequence that depicts a boot-up sequence of the electronic product. In some embodiments, providing the software feature includes displaying, with the virtual object corresponding to the electronic product, a video depicting one or more aspects of the software feature.

In some embodiments, a device for providing the software feature of the electronic product in the AR environment includes one or more processors and memory storing one or more programs configured to be executed by the one or more processors. The one or more programs include instructions for obtaining images using one or more image sensors; determining whether the obtained images include printed media depicting the electronic product; in accordance with a first set of one or more conditions being satisfied, the first set of one or more conditions including a first condition that is satisfied when the obtained images include the printed media depicting the electronic product, displaying a virtual object corresponding to the electronic product in the AR environment; and in accordance with a second set of one or more conditions being satisfied, the second set of one or more conditions including a second condition that is satisfied when the virtual object corresponding to the electronic product is displayed, providing, with the virtual object, the software feature of the electronic product.

In some embodiments, a non-transitory (or, optionally, transitory) computer-readable storage medium storing one or more programs configured to be executed by one or more processors provides the software feature of the electronic product in the AR environment. The one or more programs include instructions for obtaining images using one or more image sensors; determining whether the obtained images include printed media depicting the electronic product; in accordance with a first set of one or more conditions being satisfied, the first set of one or more conditions including a first condition that is satisfied when the obtained images include the printed media depicting the electronic product, displaying a virtual object corresponding to the electronic product in the AR environment; and in accordance with a second set of one or more conditions being satisfied, the second set of one or more conditions including a second condition that is satisfied when the virtual object corresponding to the electronic product is displayed, providing, with the virtual object, the software feature of the electronic product.

BRIEF DESCRIPTION OF THE DRAWINGS

In the following description, reference is made to the accompanying drawings which form a part thereof, and which illustrate several embodiments of the present disclosure. It is understood that other embodiments may be utilized and structural and operational changes may be made without departing from the scope of the present disclosure. The use of the same reference symbols in different drawings indicates similar or identical items.

FIGS. 1C-1E illustrate embodiments of the system in the form of mobile devices.

FIGS. 1F-1H illustrate embodiments of the system in the form of head-mounted display devices.

DETAILED DESCRIPTION

Figure 1A:
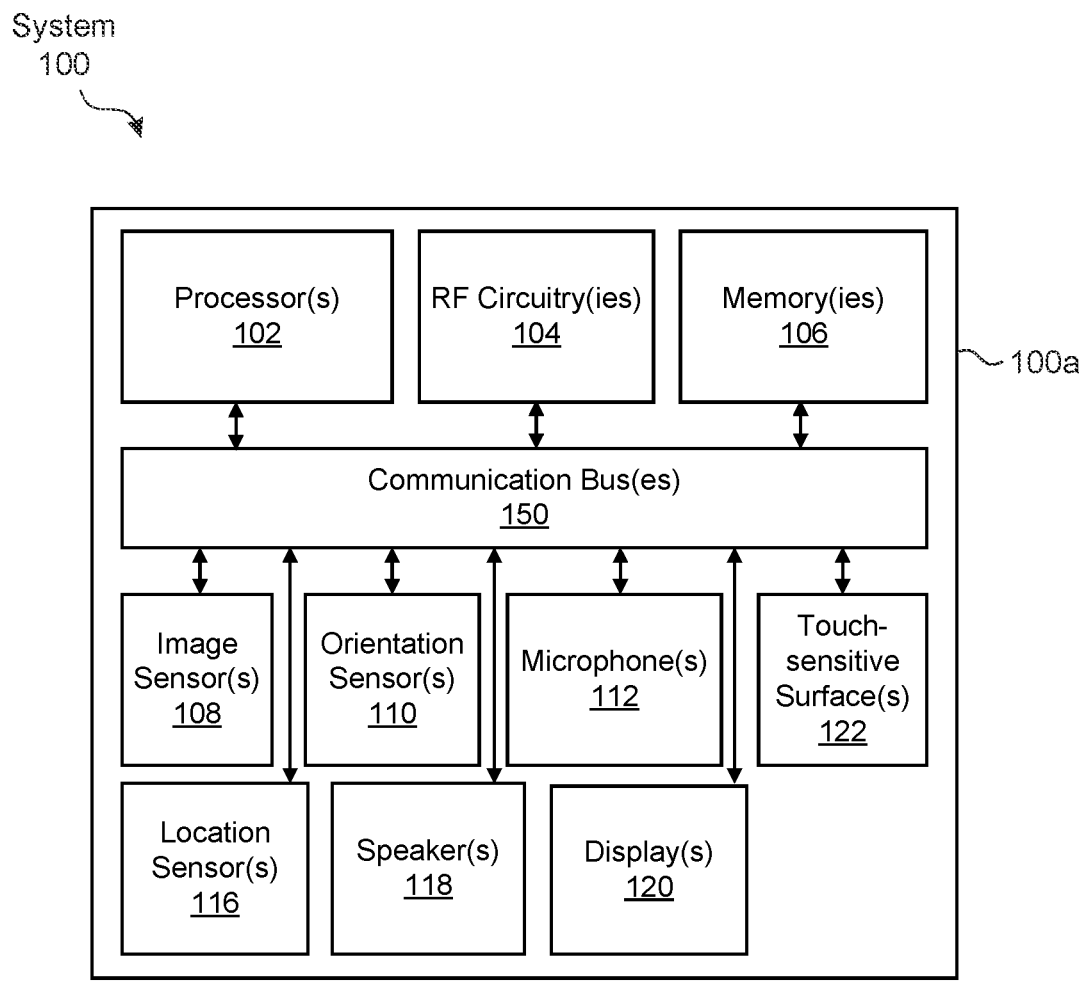
FIGS. 1A-1B depict exemplary systems for use in various computer-generated reality technologies, including virtual reality and mixed reality.

Various embodiments of electronic systems and techniques for using such systems in relation to various computer-generated reality technologies, including virtual reality and mixed reality (which incorporates sensory inputs from a physical environment), are described. In particular, the present disclosure provides techniques for displaying a virtual object corresponding to an electronic product in an AR environment. The electronic product is identified in physical printed media (e.g., magazine, newspaper, flyer, billboard, poster, and so forth), and then a virtual object corresponding to the electronic product is displayed in the AR environment. The virtual object includes one or more software features (e.g., boot-up sequence, user interfaces) of the physical electronic product. User interactions with the virtual object cause the virtual object to be modified in a manner resembling the physical electronic product. For example, a user may interact with a user interface displayed on virtual mobile phone in a similar manner as would be done on a real-world user interface of a physical mobile phone.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
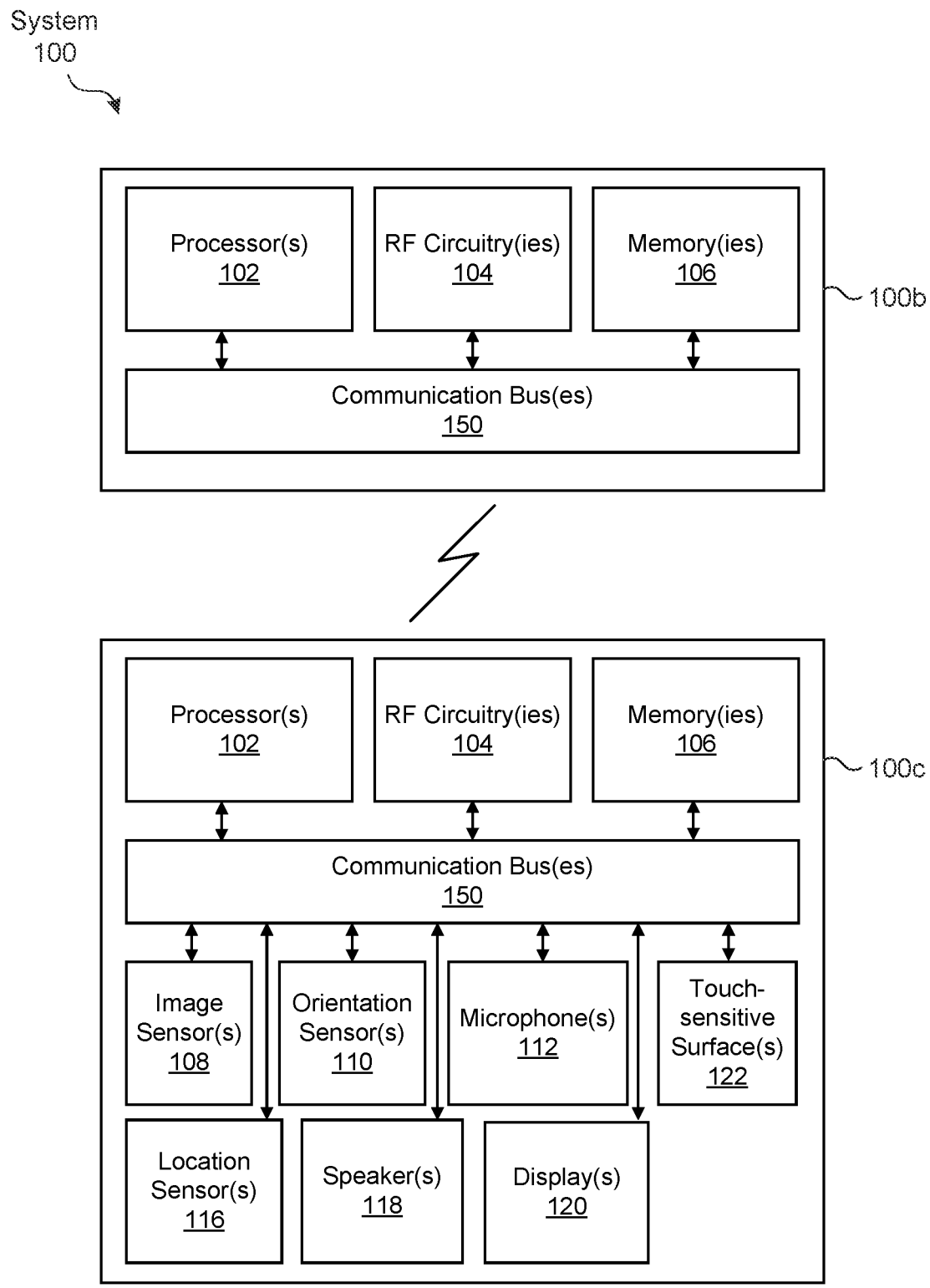

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device, such as in the embodiments described with respect to device 100a in FIGS. 1C-1E. In some embodiments, system 100 is a head-mounted display (HMD) device, such as in the embodiments described with respect to device 100a in FIGS. 1F-1H. In some embodiments, system 100 is a wearable HUD device, such as in the embodiments described with respect to device 100a in FIG. H.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate examples of system 100 in the form of device 100a. In FIGS. 1C-1E, device 100a is a mobile device, such as a cellular phone. FIG. 1C illustrates device 100a carrying out a virtual reality technique. Device 100a is displaying, on display 120, a virtual environment 160 that includes virtual objects, such as sun 160a, birds 160b, and beach 160c. Both the displayed virtual environment 160 and virtual objects (e.g., 160a, 160b, 160c) of the virtual environment 160 are computer-generated imagery. Note that the virtual reality environment depicted in FIG. 1C does not include representations of physical objects from the real environment 180, such as physical person 180a and physical tree 180b, even though these elements of real environment 180 are within the field of view of image sensor(s) 108 of device 100a.

FIG. 1D illustrates device 100a carrying out a mixed reality technique, and in particular an augmented reality technique, using pass-through video. Device 100a is displaying, on display 120, a representation 170 of the real environment 180 with virtual objects. The representation 170 of the real environment 180 includes representation 170a of person 180a and representation 170b of tree 180b. For example, the device uses image sensor(s) 108 to capture images of the real environment 180 that are passed through for display on display 120. Device 100a overlays hat 160d, which is a virtual object generated by device 100a, on the head of the representation 170a of person 180a. Device 100a tracks the location and/or orientation of physical objects with respect to the position and/or orientation of device 100a to enable virtual objects to interact with physical objects from the real environment in the augmented reality environment. In this example, device 100a accounts for movements of device 100a and person 180a to display hat 160d as being on the head of the representation 170a of person 180a, even as device 100a and person 180a move relative to one another.

FIG. 1E illustrates device 100a carrying out a mixed reality technique, and in particular an augmented virtuality technique. Device 100a is displaying, on display 120, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a in real environment 180. Device 100a places representation 170a of person 180a in virtual environment 160 for display on display 120. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of representation 170a of person 180a. Notably, in this example, device 100a does not display a representation of tree 180b even though tree 180b is also within the field of view of the image sensor(s) of device 100a, in carrying out the mixed reality technique.

FIGS. 1F-1H illustrate examples of system 100 in the form of device 100a. In FIGS. 1F-1H, device 100a is a HMD device configured to be worn on the head of a user, with each eye of the user viewing a respective display 120a and 120b.

FIG. 1F illustrates device 100a carrying out a virtual reality technique. Device 100a is displaying, on displays 120a and 120b, a virtual environment 160 that includes virtual objects, such as sun 160a, birds 160b, and beach 160c. The displayed virtual environment 160 and virtual objects (e.g., 160a, 160b, 160c) are computer-generated imagery. In this example, device 100a simultaneously displays corresponding images on display 120a and display 120b. The corresponding images include the same virtual environment 160 and virtual objects (e.g., 160a, 160b, 160c) from different viewpoints, resulting in a parallax effect that provides a user with the illusion of depth of the objects on the displays. Note that the virtual reality environment depicted in FIG. 1F does not include representations of physical objects from the real environment, such as person 180a and tree 180b even though person 180a and tree 180b are within the field of view of the image sensor(s) of device 100a, in carrying out the virtual reality technique.

FIG. 1G illustrates device 100a carrying out an augmented reality technique using pass-through video. Device 100a is displaying, on displays 120a and 120b, a representation 170 of real environment 180 with virtual objects. The representation 170 of real environment 180 includes representation 170a of person 180a and representation 170b of tree 180b. For example, device 100a uses image sensor(s) 108 to capture images of the real environment 180 that are passed through for display on displays 120a and 120b. Device 100a is overlaying a computer-generated hat 160d (a virtual object) on the head of representation 170a of person 180a for display on each of displays 120a and 120b. Device 100a tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of representation 170a of person 180a.

FIG. 1H illustrates device 100a carrying out a mixed reality technique, and in particular an augmented virtuality technique, using pass-through video. Device 100a is displaying, on displays 120a and 120b, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a. Device 100a places the representation 170a of the person 180a in the virtual environment for display on displays 120a and 120b. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of the representation 170a of person 180a. Notably, in this example, device 100a does not display a representation of tree 180b even though tree 180b is also within the field of view of the image sensor(s) 108 of device 100a, in carrying out the mixed reality technique.

Figure 1I:
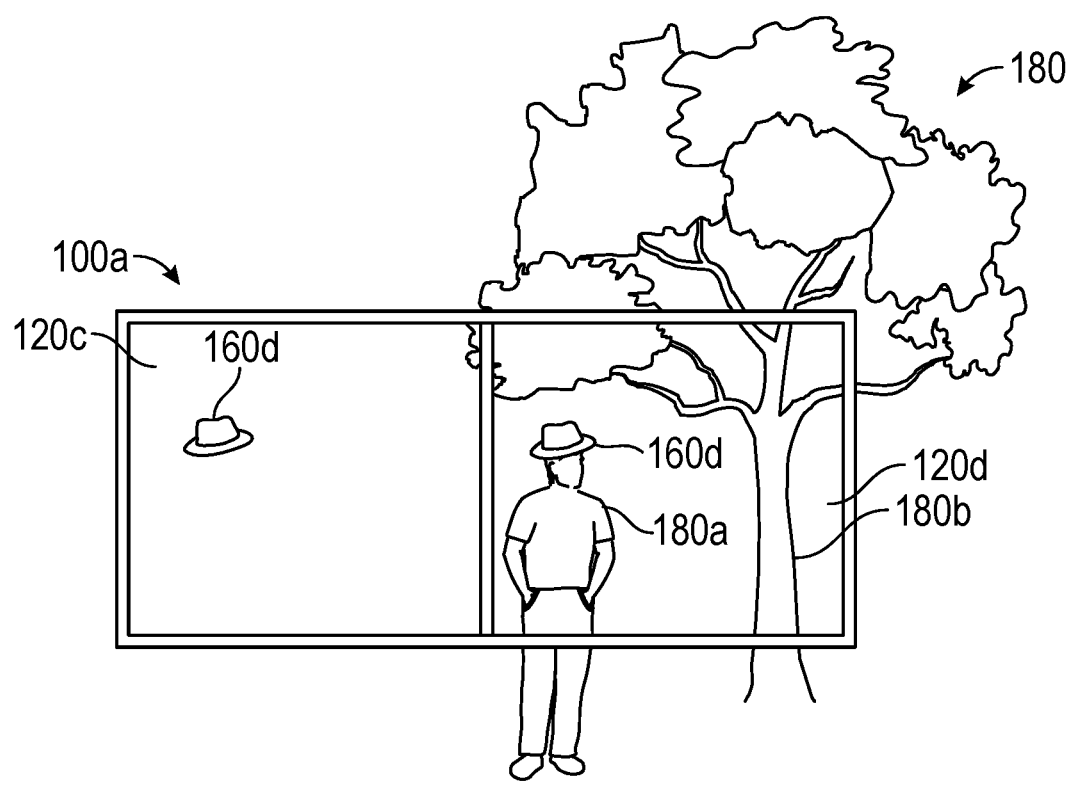
FIG. 1I illustrates an embodiment of the system in the form of a head-up display device.

FIG. 1I illustrates an example of system 100 in the form of device 100a. In FIG. 1I, device 100a is a HUD device (e.g., a glasses device) configured to be worn on the head of a user, with each eye of the user viewing a respective heads-up display 120c and 120d. FIG. 1I illustrates device 100a carrying out an augmented reality technique using heads-up displays 120c and 120d. The heads-up displays 120c and 120d are (at least partially) transparent displays, thus allowing the user to view the real environment 180 in combination with heads-up displays 120c and 120d. Device 100a is displaying, on each of heads-up displays 120c and 120d, a virtual hat 160d (a virtual object). The device 100a tracks the location and/or orientation of physical objects in the real environment with respect to the position and/or orientation of device 100a and with respect to the position of the user's eyes to enable virtual objects to interact with physical objects from real environment 180. In this example, device 100a accounts for movements of device 100a, movements of the user's eyes with respect to device 100a, and movements of person 180a to display hat 160d at locations on displays 120c and 120d such that it appears to the user that the hat 160d is on the head of person 180a.

Figure 2:
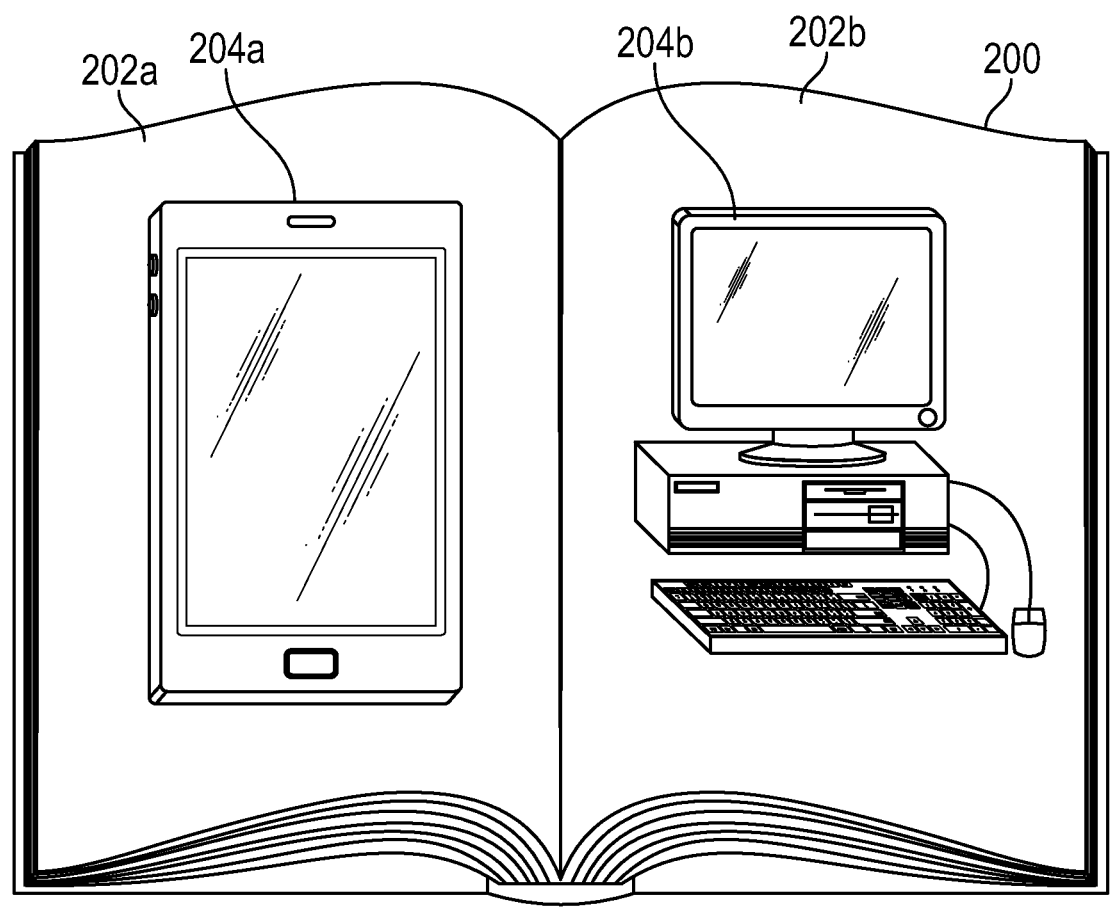
FIG. 2 illustrates an example of physical printed media.

FIG. 2 illustrates an example of physical printed media 200 (e.g., a book). Printed media 200 includes pages 202a-202b that depict electronic products. For example, page 202a of printed media 200 depicts electronic product 204a (e.g., a mobile phone) and page 202b of printed media 200 depicts electronic product 204b (e.g., a desktop computer). While shown as a book in FIG. 2, printed media 200 may be any physical printed media, such as a magazine, newspaper, flyer, billboard, poster, and so forth.

Figure 3:
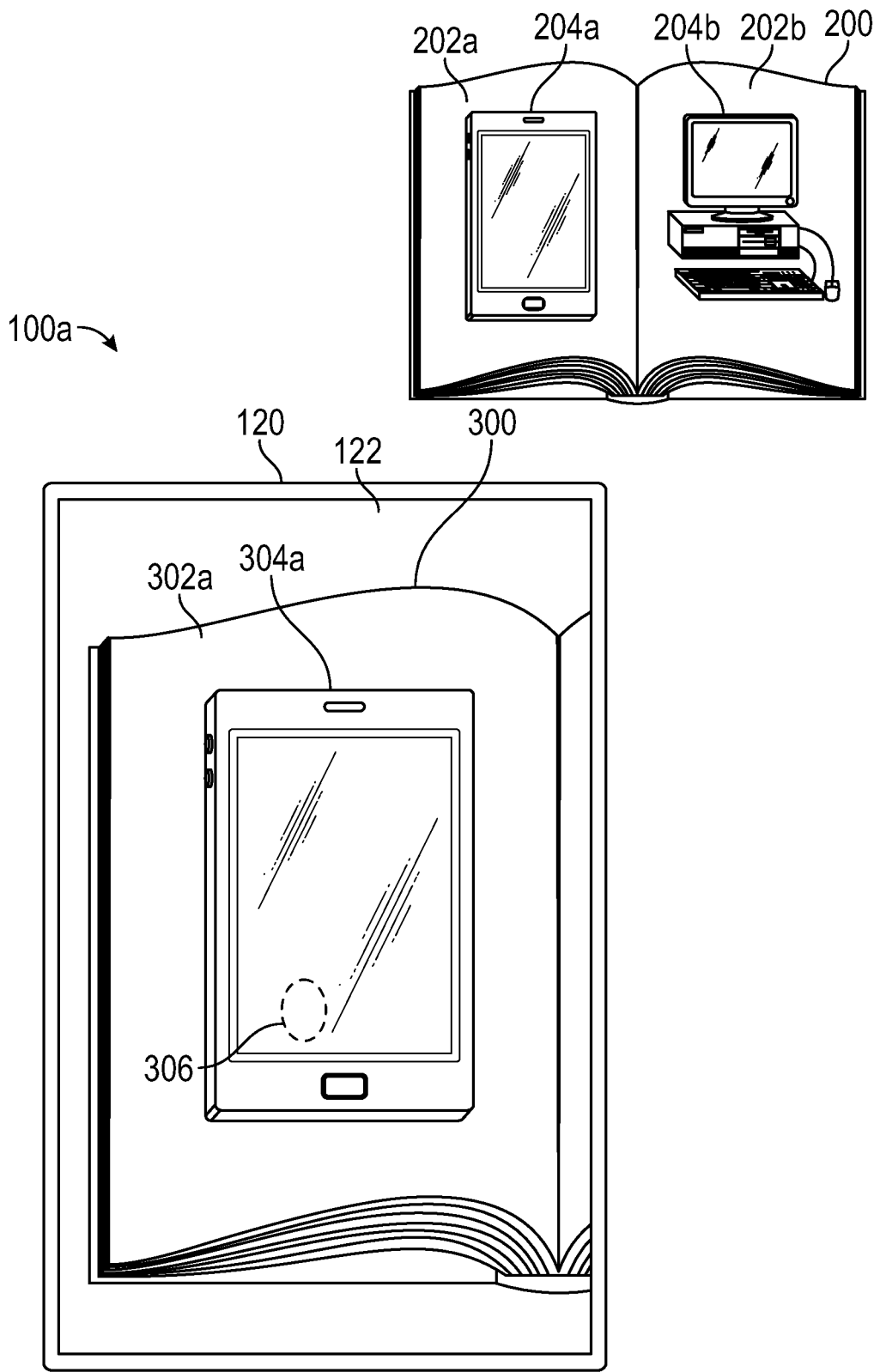
FIG. 3 illustrates an embodiment of a device displaying a representation of printed media.

FIG. 3 illustrates an embodiment of device 100a displaying, on display 120, a representation 300 of printed media 200, meaning that an image sensor of device 100a is capturing live image(s) of printed media 200 and display 120 is displaying relevant captured image content. Device 100a is an embodiment of system 100, as described in reference to FIGS. 1A-1B. In FIG. 3, device 100a is shown as a mobile device, such as a mobile phone. However, it should be understood that device 100a can be any device configured to display an augmented reality environment, such as the devices described in reference to FIGS. 1D, 1G, and 1I.

The representation 300 of printed media 200 shown in FIG. 3 includes a representation 302a of page 202a and a representation 304a of electronic product 204a. For example, the device 100a uses one or more image sensors (such as image sensor(s) 108 described in reference to FIGS. 1A-1B) to capture images of the printed media 200 that are passed through for display on display 120. In some embodiments, when device 100a detects that the captured images include a depiction of electronic product 204a, an affordance is displayed to indicate that the depiction of electronic product 204a is detected, and that a virtual electronic product (e.g., a computer-generated three-dimensional virtual object corresponding to the electronic product) is available for display.

Figure 5:
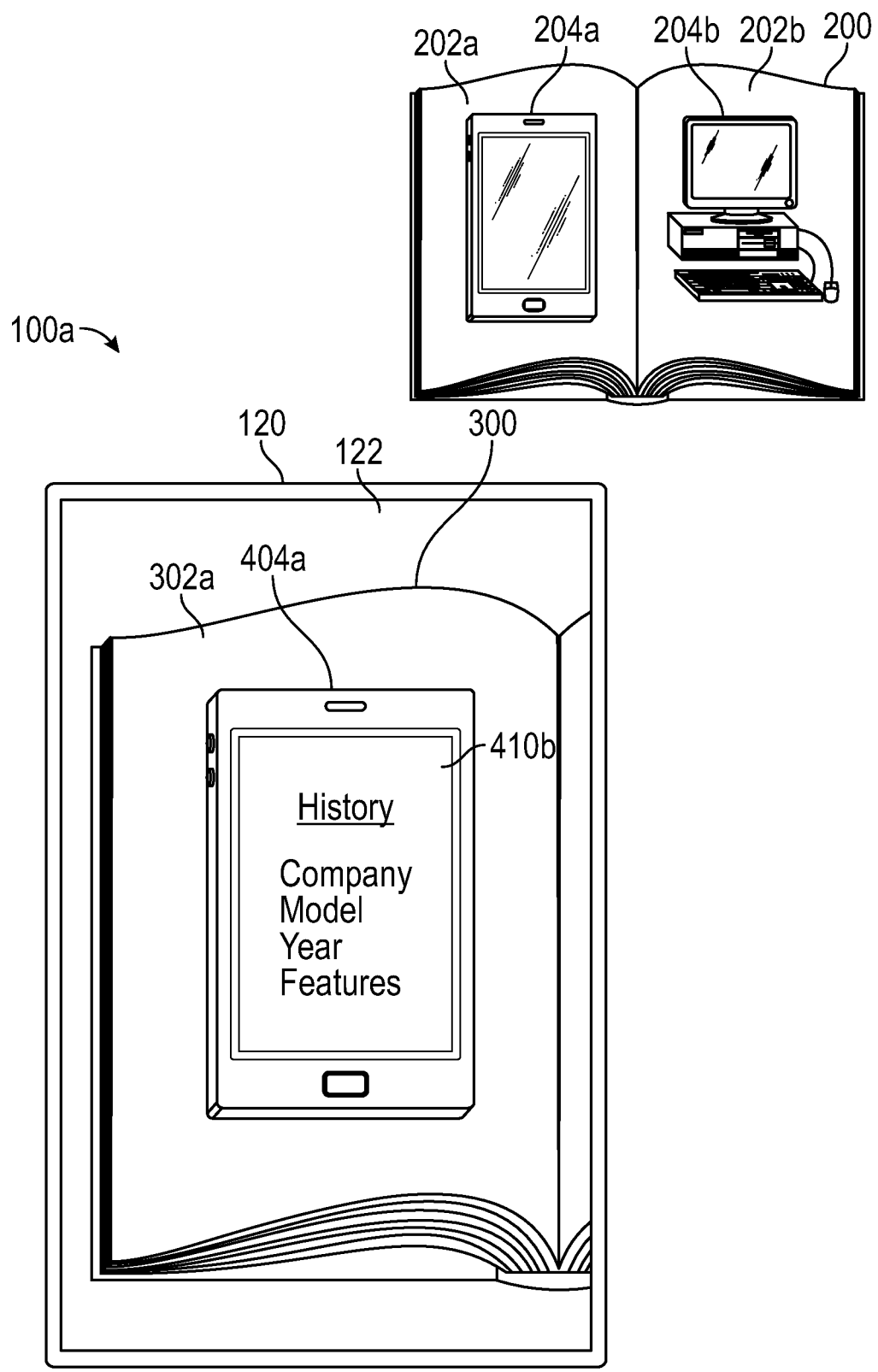
FIG. 5 illustrates an embodiment of a device displaying a virtual electronic product after a user interaction with an emulated software feature.
Figure 6:
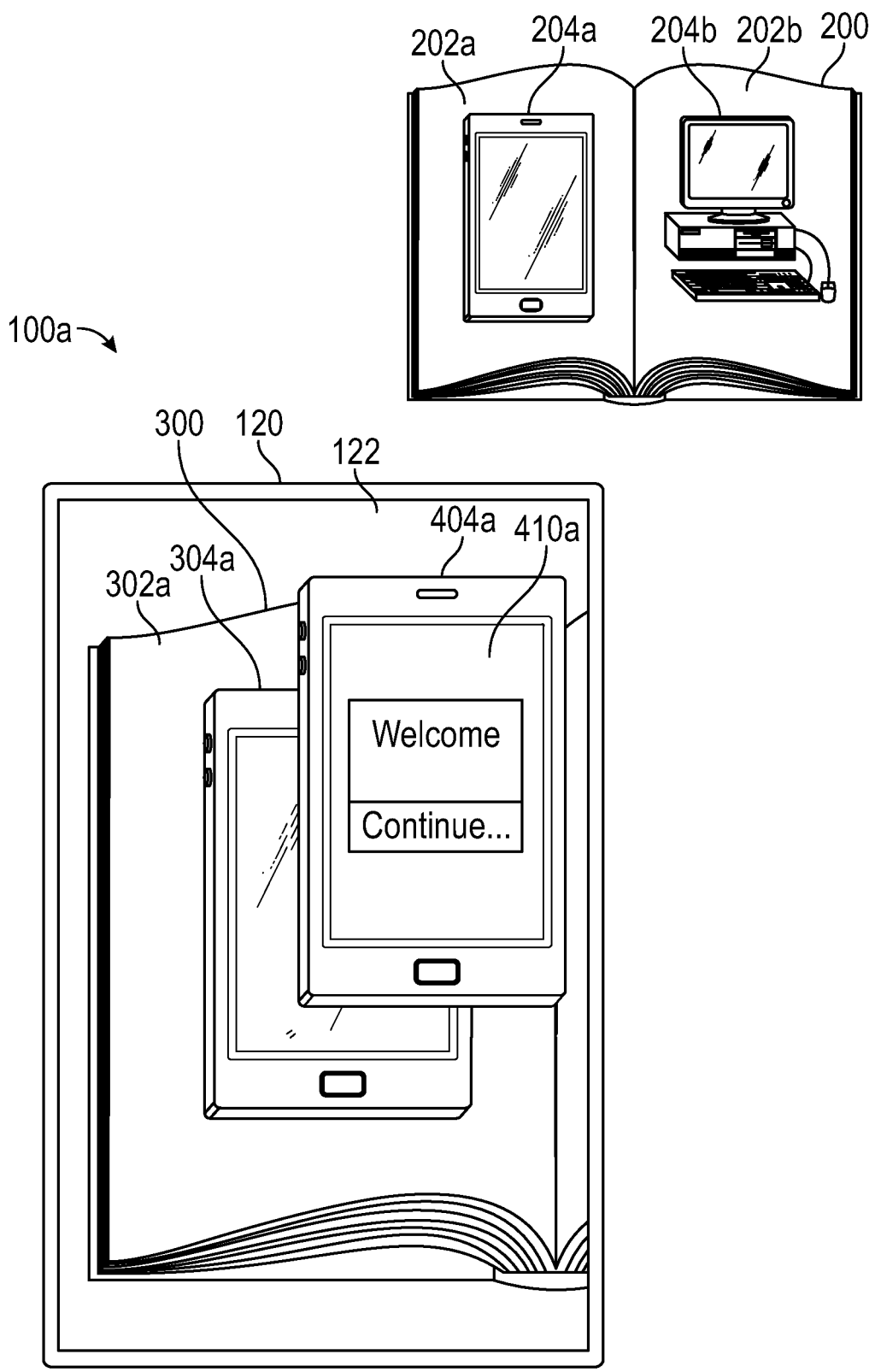
FIG. 6 illustrates another embodiment of a device displaying a virtual electronic product overlaying a representation of printed media.

In some embodiments, the device 100a receives a user input 306, such as a tap input, on touch-sensitive surface(s) 122. In some embodiments, the user input 306 is at a location on the display 120 where the representation 304a of the electronic product 204a is being displayed. In some embodiments, the user input 306 is at a location of an affordance indicating the availability of a virtual electronic product (e.g., a computer-generated three-dimensional virtual object corresponding to the electronic product) for display. In response to receiving user input 306, device 100a overlays or replaces the representation 304a of electronic product 204a with a virtual electronic product, as shown in FIGS. 4-6.

In some embodiments (such as with a HMD device or a HUD device), device 100a detects user input 306 by tracking the position of a user's hand or finger. When the device 100a determines that the user's hand or finger touches the depiction of electronic product 204a in printed media 200, device 100a overlays or replaces the representation 304a of electronic product 204a with a virtual electronic product (e.g., a computer-generated three-dimensional virtual object corresponding to the electronic product), as shown in FIGS. 4-6.

In some embodiments, device 100a automatically displays a virtual electronic product (e.g., a computer-generated three-dimensional virtual object corresponding to the electronic product) in response to device 100a determining that printed media 200 depicts electronic product 204a. In some embodiments, device 100a determines printed media 200 depicts electronic product 204a by detecting the appearance of electronic product 204a in images captured by device 100a (such as with image sensor(s) 108 described in reference to FIGS. 1A-1B). In some embodiments, device 100a determines printed media 200 depicts electronic product 204a by determining that images of the printed media 200 include other characteristics associated with electronic product 204a, such as predefined text in the printed media 200, unique symbols (such as a QR code) in the printed media 200, and/or the location and orientation of content (such as text or images) in the printed media 200.

Figure 4:
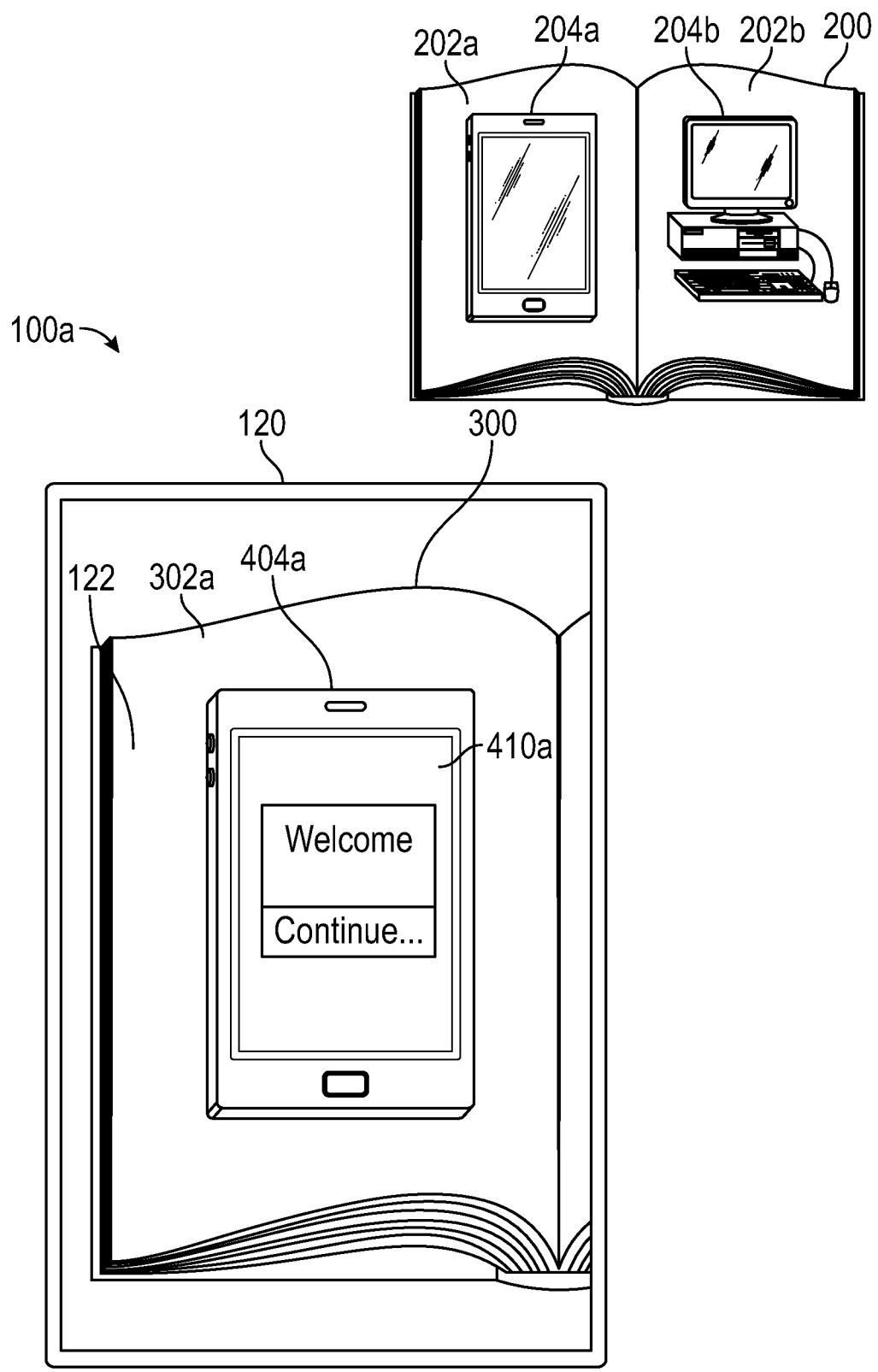
FIG. 4 illustrates an embodiment of a device displaying a virtual electronic product overlaying a representation of printed media.

FIG. 4 illustrates an embodiment of device 100a displaying, on display 120, a virtual electronic product 404a overlaying representation 300 of printed media 200. Device 100a is an embodiment of system 100, as described in reference to FIGS. 1A-1B. In FIG. 4, device 100a is shown as a mobile device, such as a mobile phone. However, it should be understood that device 100a can be any device configured to display an augmented reality environment, such as the devices described in reference to FIGS. 1D, 1G, and 1I.

As shown in FIG. 4, representation 300 of printed media 200 includes representation 302a of page 202a. Virtual electronic product 404a (e.g., a computer-generated three-dimensional virtual object corresponding to the electronic product) overlays the representation 302a of page 202a. Device 100a tracks the location and/or orientation of printed media 200 with respect to the position and/or orientation of device 100a to enable the display of virtual electronic product 404a overlaying the representation 302a of page 202a. In this way, the representation 304a of electronic product 204a (as shown in FIG. 3) appears to be replaced with virtual electronic product 404a.

In some embodiments, virtual electronic product 404a is displayed in response to the device 100a receiving a user input (such as user input 306 described in reference to FIG. 3). In some embodiments, virtual electronic product 404a is automatically displayed in response to device 100a determining that printed media 200 depicts electronic product 204a. In some embodiments, device 100a determines that printed media 200 depicts electronic product 204a by detecting the appearance of electronic product 204a in images captured by device 100a (such as with image sensor(s) 108 described in reference to FIGS. 1A-1B). In some embodiments, device 100a determines printed media 200 depicts electronic product 204a by determining that images of the printed media 200 include other characteristics associated with electronic product 204a, such as predefined text in the printed media 200, unique symbols (such as a QR code) in the printed media 200, and/or the location and orientation of content (such as text or images) in the printed media 200.

In some embodiments, before displaying virtual electronic product 404a, device 100a determines whether printed media 200 is predefined printed media, such as a specific book, a specific page of a book, or a specific depiction of the electronic product. In some embodiments, device 100a determines that printed media 200 is predefined printed media by detecting that images of the printed media 200 include characteristics associated with the predefined printed media, such as predefined text in the printed media 200, unique symbols (such as a QR code) in the printed media 200, and/or the location and orientation of content (such as text or images) in the printed media 200. By determining whether printed media 200 is predefined printed media, device 100a limits access to the virtual electronic product 404a to devices having access to the predefined printed media. Printed media other than the predefined printed media that depict the electronic product would not result in device 100a displaying virtual electronic product 404a. Alternatively or in addition, in some embodiments, when predefined printed media is detected, device 100a provides additional information about the predefined printed media and/or electronic products depicted in the predefined printed media, in addition to the virtual electronic product 404a (e.g., extra content is provided when device 100a has access to the predefined printed media).

In some embodiments, access to virtual electronic product 404a is limited to predefined depictions of electronic product 204a in printed media 200. For example, device 100a determines whether the depiction of electronic product 204a in printed media 200 includes a depiction of a screen of electronic product 204a before displaying virtual electronic product 404a. If the depiction of electronic product 204a in printed media 200 is from a point of view not showing the screen (e.g., top view, side view, rear view), then the virtual electronic product 404a is not displayed.

In cases where electronic product 204a is a depiction of a physical electronic product that includes a software feature (e.g., a user interface), the displayed virtual electronic product 404a includes an emulation 410a of the software feature. The emulated software feature 410a recreates the appearance and operation of the physical electronic product's software feature. In some embodiments, the emulated software feature 410a recreates the appearance of the physical electronic product's boot-up sequence. In some embodiments, the emulated software feature 410a is a predefined video depicting the appearance and operation of the physical electronic product's software feature.

In some embodiments, virtual electronic product 404a and/or emulated software feature 410a are modified in response to device 100a detecting a user interaction. In some embodiments, device 100a detects the user interaction when a user contacts touch-sensitive surface(s) 122. For example, when device 100a detects a contact on touch-sensitive surface(s) 122 at a location on display 120 where the virtual electronic product 404a is being displayed, device 100a interprets the contact as a user interaction with virtual electronic product 404a and/or emulated software feature 410a. In this way, device 100a treats interactions with touch-sensitive surface(s) 122 as interactions with virtual electronic product 404a and/or emulated software feature 410a.

In some embodiments (such as with a HMD device or HUD device), device 100a detects the user interaction by tracking the position of a user's hand or finger. For example, when the device 100a determines that the user's hand or finger touches the depiction of electronic product 204a in printed media 200, device 100a interprets the user's hand or finger placement as a user interaction with virtual electronic product 404a and/or emulated software feature 410a.

The virtual electronic product 404a and/or emulated software feature 410a responds to the user interaction in a manner resembling a user interaction with the physical electronic product. For example, when device 100a detects a user interaction on display 120 at a location where a power button of virtual electronic product 404a is being displayed, virtual electronic product 404a is modified to correspond to how the physical electronic product would respond to a user interaction with a physical power button (e.g., turn the screen on or off). When device 100a detects a user interaction on display 120 at a location where an interactive element of emulated software feature 410a is being displayed (e.g. "continue" element shown in FIG. 4), emulated software feature 410a is modified to correspond to the selected element (e.g., the emulated user interface is modified to display historical information about the electronic product, as shown in FIG. 5).

In some embodiments, device 100a modifies virtual electronic product 404a based on the depiction of electronic product 204a in printed media 200. For example, if the printed media 200 depicts a top view of the electronic product 204a, then the displayed virtual electronic product 404a is rotated to correspond to the orientation being depicted in the printed media 200. In some embodiments, the orientation of virtual electronic product 404a is modified (e.g., rotated) in response to a user interaction, such as a swipe on touch-sensitive surface(s) 122.

FIG. 5 illustrates an embodiment of device 100a displaying, on display 120, virtual electronic product 404a after a user interaction with emulated software feature 410a (shown in FIG. 4). Device 100a is an embodiment of system 100, as described in reference to FIGS. 1A-1B. In FIG. 5, device 100a is shown as a mobile device, such as a mobile phone. However, it should be understood that device 100a can be any device configured to display an augmented reality environment, such as the devices described in reference to FIGS. 1D, 1G, and 1I.

As shown in FIG. 5, in response to detecting a user interaction with emulated software feature 410a (shown in FIG. 4), device 100a modifies emulated software feature 410a and displays emulated software feature 410b. For example, when device 100a detects a user interaction on display 120 at a location where an interactive element of emulated software feature 410a is being displayed (e.g. "continue" element shown in FIG. 4), emulated software feature 410b corresponding to the selected element is displayed (e.g., the emulated user interface is modified to display historical information about the electronic product, as shown in FIG. 5). As another example, if device 100a detects a user interaction at a location of an application icon being displayed as part emulated software feature 410a, then device 100a displays emulated software feature 410b corresponding to an emulated version of the application being launched within virtual electronic product 404a (e.g., emulated software feature 410b corresponds to a software feature of the launched application).

FIG. 6 illustrates another embodiment of device 100a displaying, on display 120, a virtual electronic product 404a overlaying representation 300 of printed media 200. Device 100a is an embodiment of system 100, as described in reference to FIGS. 1A-1B. In FIG. 6, device 100a is shown as a mobile device, such as a mobile phone. However, it should be understood that device 100a can be any device configured to display an augmented reality environment, such as the devices described in reference to FIGS. 1D, 1G, and 1I.

As shown in FIG. 6, representation 300 of printed media 200 includes representation 302a of page 202a. In contrast to FIG. 4, virtual electronic product 404a (e.g., a computer-generated three-dimensional virtual object corresponding to the electronic product) is displayed such that it appears to be hovering above the representation 304a of electronic product 204a. Device 100a tracks the location and/or orientation of printed media 200 with respect to the position and/or orientation of device 100a to enable the display of virtual electronic product 404a hovering above the representation 304a of electronic product 204a. Device 100a detects user interactions with virtual electronic product 404a as described in reference to FIGS. 4-5.

Figure 7:
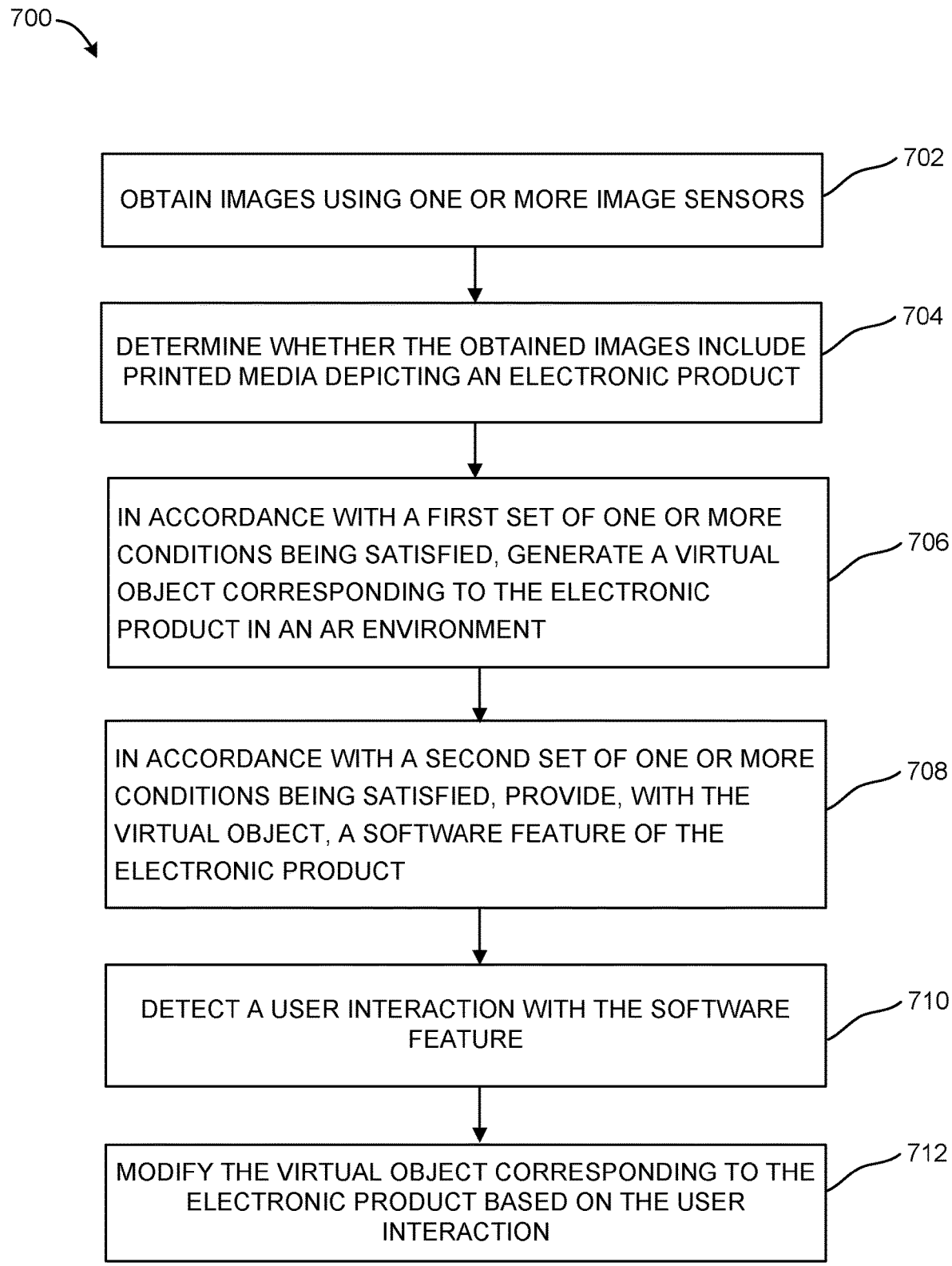
FIG. 7 illustrates an exemplary technique for providing a software feature of an electronic product in an augmented reality environment.

FIG. 7 illustrates an exemplary technique 700 for providing a software feature of an electronic product (e.g., a computer, mobile phone, tablet, watch, or video game console) in an augmented reality environment. In some embodiments, the technique is carried out by system 100 described in reference to FIGS. 1A-6. At block 702, images are obtained using one or more image sensors (e.g., image sensor(s) 108 described in reference to FIGS. 1A-1B).

At block 704, a determination is made whether the obtained images include printed media (e.g., printed media 200 described in reference to FIGS. 2-6) depicting the electronic product (e.g., electronic product 204a described in reference to FIGS. 2-6).

At block 706, in accordance with a first set of one or more conditions being satisfied, a virtual object corresponding to the electronic product (e.g., virtual electronic product 404a described in reference to FIGS. 2-6) is displayed in the AR environment. The first set of one or more conditions includes a condition that is satisfied when the obtained images include the printed media depicting the electronic product. In some embodiments, the first set of one or more conditions also includes a condition that is satisfied when the printed media corresponds to predefined printed media. In some embodiments, the predefined printed media is a predefined book, a predefined page of a predefined book, or a predefined depiction of the electronic product. In some embodiments, the first set of one or more conditions includes a condition that is satisfied when the depiction of the electronic product in the printed media includes a depiction of a screen of the electronic product. In some embodiments, the first set of one or more conditions includes a condition that is satisfied that is satisfied when a user input is detected (e.g., user input 306 described in reference to FIG. 3).

At block 708, in accordance with a second set of one or more conditions being satisfied, the software feature of the electronic product is provided with the virtual object. The second set of one or more conditions includes a condition that is satisfied when the virtual object is displayed. In some embodiments, the second set of one or more conditions also includes a condition that is satisfied when a user interaction with the virtual object is detected (e.g., detecting a user interaction at a location corresponding to a virtual power button). In some embodiments, providing the software feature includes displaying, with the virtual object, an artificial boot-up sequence that depicts a boot-up sequence of the physical electronic product. In some embodiments, the software feature is provided by displaying, with the virtual object, a video depicting one or more aspects of the software feature (e.g., a video that recreates the appearance of the product's boot-up sequence).

At block 710, a user interaction with the software feature is detected. In some embodiments, the user interaction is an touch contact on a touch-screen display at a location corresponding to the displayed software feature (e.g., a tap gesture is detected on the touch-screen display at a location corresponding to where the software feature is displayed). In some embodiments, the user interaction is detected by detecting that a physical position of the user's hand or finger corresponds to a position in the AR environment of the software feature (e.g., the physical position of the user's hand or finger corresponds to where the virtual object appears to be positioned, such as on a page of the printed media).

At block 712, the virtual object corresponding to the electronic product is modified based on the user interaction. For example, an application is launched, additional information is displayed, or a user interface is modified based on the user interaction. In some embodiments, in accordance with detecting a first type of user interaction with the virtual object, the virtual object is modified according to a first function, and in accordance with detecting a second type of user interaction (different from the first type) with the virtual object, the virtual object is modified according to a second function that is different from the first function. For example, the virtual object is modified to provide different feedback based on different locations of user touch inputs on the virtual object.

While the present disclosure has been shown and described with reference to the embodiments provided herein, it will be understood by those skilled in the art that various changes in form and details may be made without departing from the scope of the present disclosure.

What is claimed is:

1. A device for providing a software feature of an electronic product in an augmented reality (AR) environment, comprising:
one or more processors; and
memory storing one or more programs configured to be executed by the one or more processors, the one or more programs including instructions for:
obtaining, using one or more image sensors, images depicting a screen of the electronic product;
displaying a virtual object corresponding to the electronic product in the AR environment, wherein the virtual object includes a virtual screen overlaying the screen of the electronic product;
displaying, with the virtual screen of the virtual object, the software feature of the electronic product;
detecting a user interaction with the software feature; and
modifying the virtual object corresponding to the electronic product based on the user interaction.

2. The device of claim 1, wherein detecting the user interaction comprises:
detecting a touch contact on a touch-screen display at a location corresponding to the provided software feature.

3. The device of claim 1, wherein detecting the user interaction comprises:
detecting that a physical position of the user's hand or finger corresponds to a position in the AR environment of the software feature.

4. The device of claim 1, wherein the images depicting the screen of the electronic product are images of printed media.

5. The device of claim 4, wherein the printed media is a predefined book, a predefined page of a predefined book, or a predefined depiction of the electronic product.

6. The device of claim 1, wherein displaying the software feature of the electronic product includes displaying, with the virtual screen of the virtual object, an artificial boot-up sequence that depicts a boot-up sequence of the electronic product.

7. The device of claim 1, wherein displaying the software feature of the electronic product includes displaying, with the virtual screen of the virtual object, a video depicting one or more aspects of the software feature.

8. A non-transitory computer-readable storage medium storing one or more programs configured to be executed by one or more processors, the one or more programs including instructions for:
obtaining, using one or more image sensors, images depicting a screen of the electronic product;
displaying a virtual object corresponding to the electronic product in the AR environment, wherein the virtual object includes a virtual screen overlaying the screen of the electronic product;
displaying, with the virtual screen of the virtual object, the software feature of the electronic product;
detecting a user interaction with the software feature; and
modifying the virtual object corresponding to the electronic product based on the user interaction.

9. The non-transitory computer-readable storage medium of claim 8, wherein detecting the user interaction comprises:
detecting a touch contact on a touch-screen display at a location corresponding to the provided software feature.

10. The non-transitory computer-readable storage medium of claim 8, wherein detecting the user interaction comprises:
detecting that a physical position of the user's hand or finger corresponds to a position in the AR environment of the software feature.

11. The non-transitory computer-readable storage medium of claim 8, wherein the images depicting the screen of the electronic product are images of printed media.

12. The non-transitory computer-readable storage medium of claim 11, wherein the printed media is a predefined book, a predefined page of a predefined book, or a predefined depiction of the electronic product.

13. The non-transitory computer-readable storage medium of claim 8, wherein displaying the software feature of the electronic product includes displaying, with the virtual screen of the virtual object, an artificial boot-up sequence that depicts a boot-up sequence of the electronic product.

14. The non-transitory computer-readable storage medium of claim 8, wherein displaying the software feature of the electronic product includes displaying, with the virtual screen of the virtual object, a video depicting one or more aspects of the software feature.

15. A method for providing a software feature of an electronic product in an augmented reality (AR) environment, the method comprising:
obtaining, using one or more image sensors, images depicting a screen of the electronic product;
displaying a virtual object corresponding to the electronic product in the AR environment, wherein the virtual object includes a virtual screen overlaying the screen of the electronic product;
displaying, with the virtual screen of the virtual object, the software feature of the electronic product;
detecting a user interaction with the software feature; and
modifying the virtual object corresponding to the electronic product based on the user interaction.

16. The method of claim 15, wherein detecting the user interaction comprises:
   detecting a touch contact on a touch-screen display at a location corresponding to the provided software feature.

17. The method of claim 15, wherein detecting the user interaction comprises:
   detecting that a physical position of the user's hand or finger corresponds to a position in the AR environment of the software feature.

18. The method of claim 15, wherein the images depicting the screen of the electronic product are images of printed media.

19. The method of claim 18, wherein the printed media is a predefined book, a predefined page of a predefined book, or a predefined depiction of the electronic product.

20. The method of claim 15, wherein displaying the software feature of the electronic product includes displaying, with the virtual screen of the virtual object, an artificial boot-up sequence that depicts a boot-up sequence of the electronic product.

21. The method of claim 15, wherein displaying the software feature of the electronic product includes displaying, with the virtual screen of the virtual object, a video depicting one or more aspects of the software feature.

* * * * *